(12) United States Patent
Kim et al.

(10) Patent No.: US 11,615,354 B2
(45) Date of Patent: Mar. 28, 2023

(54) BLOCKCHAIN BASED PROJECT EVALUATION METHOD AND SYSTEM

(71) Applicant: SOONCHUNHYANG UNIVERSITY INDUSTRY ACADEMY COOPERATION FOUNDATION, Asan-si (KR)

(72) Inventors: Seung Woo Kim, Seoul (KR); Jae Geol Cho, Seongnam (KR); Sang Han Lee, Seoul (KR); Dae Hee Kim, Suwon (KR); Sun Joo Ryu, Seongnam (KR); Joo Sung Hong, Asan (KR)

(73) Assignee: SOONCHUNHYANG UNIVERSITY INDUSTRY ACADEMY COOPERATION FOUNDATION, Asan si (KR)

( * ) Notice: Subject to any disclaimer, the term of this patent is extended or adjusted under 35 U.S.C. 154(b) by 0 days.

(21) Appl. No.: 17/002,962

(22) Filed: Aug. 26, 2020

(65) Prior Publication Data
US 2021/0065096 A1 Mar. 4, 2021

(30) Foreign Application Priority Data
Aug. 28, 2019 (KR) .................. 10-2019-0105590

(51) Int. Cl.
G06Q 10/00 (2012.01)
G06Q 10/0631 (2023.01)
G06Q 10/0639 (2023.01)
G06F 16/27 (2019.01)

(52) U.S. Cl.
CPC ..... G06Q 10/063118 (2013.01); G06F 16/27 (2019.01); G06Q 10/06398 (2013.01); G06Q 2220/00 (2013.01)

(58) Field of Classification Search
CPC combination set(s) only.
See application file for complete search history.

(56) References Cited

U.S. PATENT DOCUMENTS

| | | | | |
|---|---|---|---|---|
| 2018/0068271 A1* | 3/2018 | Abebe | ............... | G06Q 10/103 |
| 2019/0343429 A1* | 11/2019 | Elhawary | ............. | A61B 5/1126 |
| 2020/0005207 A1* | 1/2020 | Lee | ................ | G06Q 10/06312 |
| 2020/0162237 A1* | 5/2020 | Chauhan | ................ | H04L 9/30 |
| 2020/0311646 A1* | 10/2020 | Koenig | ................ | H04L 9/0643 |

* cited by examiner

*Primary Examiner* — Hafiz A Kassim
*Assistant Examiner* — Matheus Ribeiro Stivaletti
(74) *Attorney, Agent, or Firm* — Eandi Fitzpatrick LLP

(57) ABSTRACT

Provided is a method of evaluating a project, which is performed by a server. The method may include determining team members who are to perform a project, receiving project activity contents generated by at least one of the team members and transmitting the project activity contents to a node on a blockchain. The project activity contents may include an execution completion report on at least one of tasks configuring the project, execution results of the project, evaluation of the results by the team members, and feedback for the evaluation.

2 Claims, 4 Drawing Sheets

BLOCKCHAIN BASED PROJECT EVALUATION METHOD AND SYSTEM

CROSS-REFERENCE TO RELATED APPLICATIONS

This application claims priority under the Paris Convention based on 10-2019-0105590 filed in Korea Aug. 28, 2019, all contents of which are hereby expressly incorporated by reference.

RELATED ART

The present disclosure relates to a method and system for evaluating a project based on a blockchain.

RELATED ART

A project may include various execution tasks. In general, a team composed of a plurality of team members performs one project.

In a project or project method education performed by a team, a level of achievement of the final results of each team may be evaluated. However, there is a problem in that it is difficult to evaluate a process of producing the results of the team and to check what activities have been performed by team members within the team in order to produce the results and to which degree the team members have contributed. To this end, the evaluation of each team member is performed with reference to the evaluation of the team results and relative evaluation results between the team members. However, it is necessary to secure and record reliable data for the purpose of fair evaluation because closeness or vague estimation is commonly included in the relative evaluation between the team members.

Furthermore, pieces of information, such as the results of such a project, activity information for each team member, and a level of a contribution of each team member, are subjective and have a danger of hacking and forgery, thus having low transparency, objectiveness, and reliability in project evaluation.

SUMMARY OF THE DISCLOSURE

The present disclosure provides a method and system for evaluating a project based on a blockchain.

A technological object to be achieved by the present embodiment is not limited to the aforementioned technological object, and other technological objects may be inferred from the following embodiments.

In an aspect, a method of evaluating a project is performed by a server, and may include determining team members who are to perform a project, receiving project activity contents generated by at least one of the team members and transmitting the project activity contents to a node on a blockchain. The project activity contents may include an execution completion report on at least one of tasks configuring the project, execution results of the project, evaluation of the results by the team members, and feedback for the evaluation.

Determining the team members who are to perform the project may include storing, in a database, ID information of the project and the team members who are to perform the project so that the ID information corresponds to the team members.

The method may further include providing a coin to at least one of the team members as a compensation for the project activity contents, transmitting the provision details of the coin to the node on the blockchain, and evaluating a level of a contribution to the project by each of the team members based on the provision details of the coin written in the blockchain when the project is terminated. Providing the coin may include providing a first coin quantity, corresponding to a first activity configuring the project, to a first team member who has performed the first activity and providing a second coin quantity, corresponding to a second activity configuring the project, to a second team member who has performed the second activity. Evaluating the level of a contribution to the project may be performed based on a comparison between a total coin quantity, provided to the first team member, with a total coin quantity provided to the second team member.

In another aspect, a method of evaluating a project is performed by a server, and may include determining team members who are to perform a project, receiving project activity contents generated by at least one of the team members, transmitting the project activity contents to a node on a blockchain, providing a coin to at least one of the team members as a compensation for the project activity contents, transmitting the provision details of the coin to the node on the blockchain, and evaluating a level of a contribution to the project by each of the team members based on the provision details of the coin written in the blockchain when the project is terminated. Provides the coin may include providing a first coin quantity, corresponding to a first activity configuring the project, to a first team member who has performed the first activity and providing a second coin quantity, corresponding to a second activity configuring the project, to a second team member who has performed the second activity. The first coin quantity and the second coin quantity may be previously designated and stored in a database. Evaluating the level of a contribution to the project may be performed based on a comparison between a total coin quantity, provided to the first team member, with a total coin quantity provided to the second team member.

The project activity contents may include an execution completion report on at least one of tasks configuring the project, execution results of the project, evaluation of the results by the team members, and feedback for the evaluation.

DESCRIPTION OF EXEMPLARY EMBODIMENTS

Some embodiments will be described clearly and in detail with reference to the accompanying drawings so that persons with ordinary skill in the art to which the present disclosure pertains (hereinafter referred to as persons skilled in the art) can easily practice the present disclosure.

Figure 1:
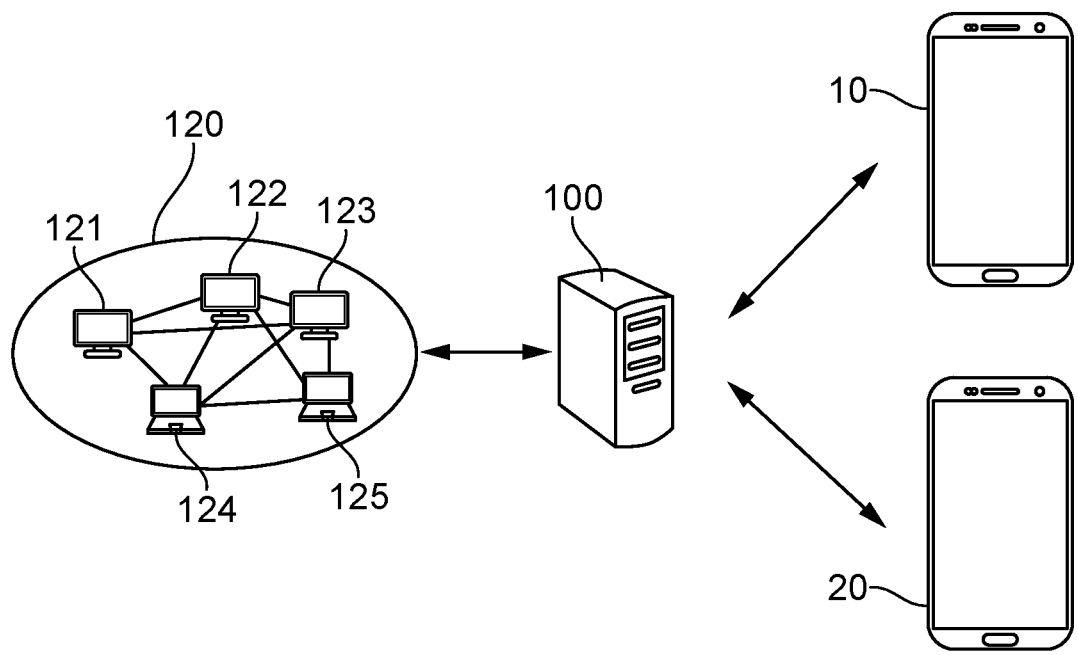
FIG. 1 illustrates a system according to an embodiment.

FIG. 1 illustrates a system 1000 according to an embodiment.

Referring to FIG. 1, the system 1000 may include a server 100, a server 100, one or more user terminals 10 and 20 capable of communication, and a blockchain network 120.

In an embodiment, the server 100 may be a server for performing a method of managing and evaluating a project according to a disclosed embodiment and for providing a service or platform based on the performing of the method. The one or more user terminals 10 and 20 may be the user terminals of team members who perform at least some of or the entire project. The user terminals 10 and 20 may include a smartphone, a computer or a wearable device. The user terminals 10 and 20 may access the server 100 over a network.

The server 100 may generate at least one project space and receive information of a project. The information of the project may mean the name and execution period of the project. The project may mean all types of projects including one or more execution tasks. A project according to an embodiment may be performed by a plurality of team members or a plurality of subjects. Each of the plurality of team members may access the server 100 through his or her user terminal, and may record his or her activity for performing a project, the results of the execution, and evaluation of the results.

The server 100 can improve transparency and security of project information based on a blockchain in providing project management and evaluation services. The blockchain is a data distribution processing technology, and refers to a technology in which all users participating in a network distribute and store data, such as all transaction histories. The blockchain may mean the distributed peer to peer (P2P) system of a ledger using software elements configured as an algorithm in which blocks connected in sequence in order to secure and maintain integrity negotiate use history information of services using an encryption scheme and a security technology. In this case, the distributed P2P system may have a special form of a distributed system. Furthermore, in the P2P system, all nodes within a network can mutually provide resources (e.g., processing ability, storage space, data or network bandwidth) without the coordination of a central node. Furthermore, the blockchain may mean a distributed ledger technology in which a ledger on which use history information has been recorded is distributed to a P2P network not the central server of a specific organization so that nodes within a network can record and manage the ledger in common.

The blockchain network 120 may include nodes 121, 122, 123, 124, and 125. The node may mean an element within the network of a blockchain. Each of the nodes 121, 122, 123, 124, and 125 may be an individual server device which has joined and participates in the system 1000 (e.g., a project management and evaluation platform). For example, each of the nodes 121, 122, 123, 124, and 125 may be a special-purpose computer, a general-purpose computer, a supercomputer, a mainframe computer, a personal computer, a smartphone, or a table PC, but the present disclosure is not limited thereto.

The server 100 according to an embodiment can improve the security of project-related information based on the blockchain network 120. The project-related information may include detailed information of a project, such as the name of the project and task contents of the project. Furthermore, information on the project may include detailed information of a subject who performs the project, such as the number of team members, a configuration of the team members, the type of team members, and the names of the team members. Furthermore, the information on the project may include an execution completion report on at least one of tasks configuring the project, the execution results of the project, mutual evaluation of the results by team members, a contribution ratio of each of the team members, feedback for the evaluation, and a modification of the evaluation.

Figure 2:
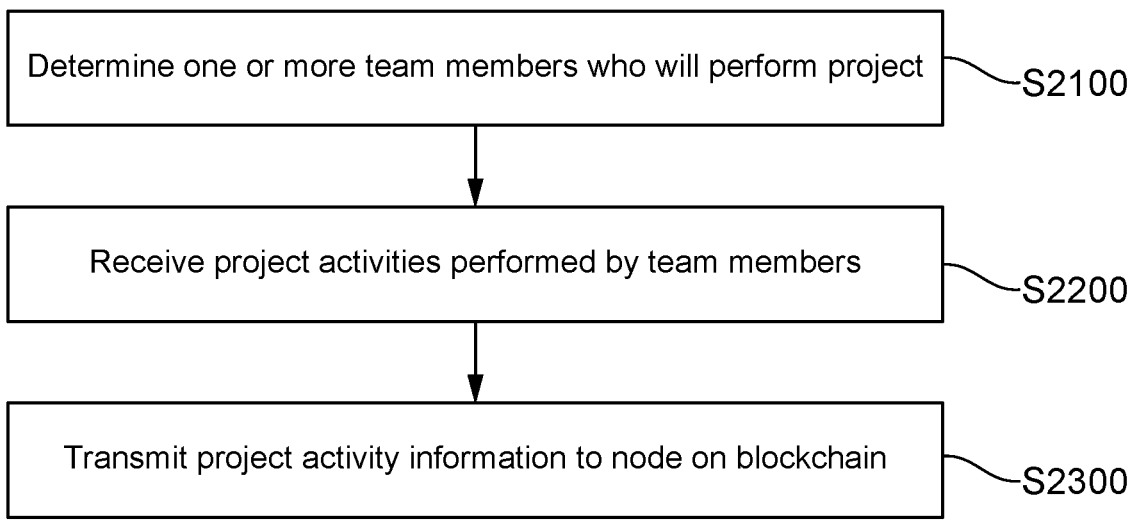
FIG. 2 illustrates a flowchart of a method of evaluating a project according to an embodiment.

FIG. 2 illustrates a flowchart of a method of evaluating a project according to an embodiment.

At step S2100, the server 100 may determine one or more team members who will perform a project. The server 100 may register a new project with a database (DB), and may determine team members who will perform the registered project. The server 100 may store ID information of the project and ID information of the team members in the DB in such a manner that the ID information of the project corresponds to the ID information of the team members. The ID information of the project may include the ID, title, object, contents or execution period of the project. The ID information of each team member may include the ID, name, or career information of each team members.

At step S2200, the server 100 may receive project activities generated by at least one of the team members. Project activity information may include all activities generated between the project team members. For example, the project activity information may include a team leader, a role handled for each execution step such as examination, a purchase, or fabrication, an execution completion report on at least one of tasks configuring a project, the execution results of the project, evaluation of the results, a contribution ratio of each of the team members or feedback for the evaluation.

At step S2300, the server 100 may transmit the project activity information to a node on the blockchain. The reason why the project activity information is transmitted to the node on the blockchain is that if each team member writes contents performed by the team member in a project after the project is terminated, several team members may input the same performance results as their performance and a level of a contribution considered by each team member may be different. Accordingly, the transmission of the project activity information is for fair evaluation in such a manner that activities generated in a project execution process are recorded as data of a blockchain form and are shared by all participants or team members by introducing the blockchain technology. Furthermore, the forgery of the project activity information is impossible.

For example, in the case of entrepreneurship education performed in a team project form in a university, a degree of participation in a project can be improved and a level of a contribution can be transparently evaluated by providing a corresponding coin to each of various types of task execution, such as an idea proposal, examination, a purchase, and working meeting, and allowing a record of the provided coin to shared by all team members. A degree of participation is not evaluated based on only performance and the final results of a project, but may be evaluated by reviewing a result calculation process based on a blockchain record. A configuration for transmitting the project activity contents to a node on the blockchain is described later with reference to FIG. 4.

Figure 3:
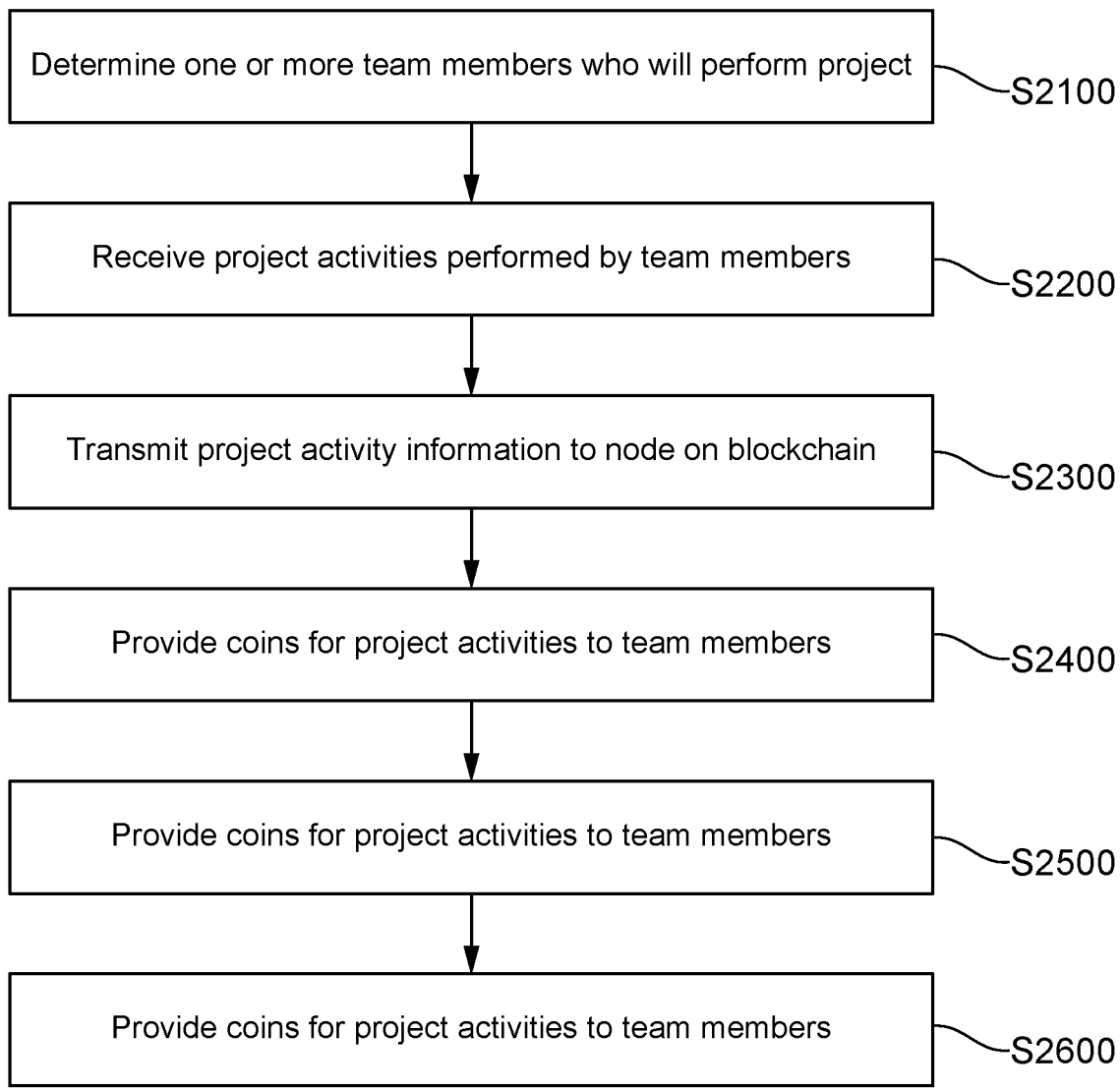
FIG. 3 illustrates a flowchart of a method of evaluating a project according to an additional embodiment.

FIG. 3 illustrates a flowchart of a method of evaluating a project according to an additional embodiment.

At step S2400, the server 100 may provide a coin to at least one of team members who have performed a project for the purpose of a compensation and evaluation for project activities. The team member may receive the coin through an electronic wallet opened in the server 100.

For example, if entrepreneurship education is performed in a team project form, the server 100 may provide, to team members who have performed a corresponding task, coins corresponding to various tasks which may be included in performing a team project, such as an idea proposal, examination, a purchase, and working meeting. The server 100 may provide a first coin quantity, corresponding to a first activity, to a first team member who has performed a first activity configuring a project. The server 100 may provide a second coin quantity, corresponding to a second activity, to a second team member who has performed a second activity configuring the project. The server 100 may additionally provide a third coin quantity, corresponding to a third activity, to the second team member who has performed a third activity configuring the project. As a result, the first team member is provided with the first coin quantity, and the second team member is provided with the second coin quantity and the third coin quantity.

The server 100 may previously assign a given coin to each of tasks configuring a project, and may provide the assigned coin to team members who have performed a corresponding task. For example, in the case of entrepreneurship education performed by team members in a team project form, a coin quantity may be previously designated for each of a plurality of tasks (e.g., idea proposal, examination, a purchase, and working meeting) for performing the team project, and the pre-designated coin may be provided to team members who have performed a corresponding task. In such an embodiment, a coin quantity for each of tasks configuring a project may be previously designated by an operator or evaluator of the project. The server 100 may provide 20 coins to a team member K who has performed an idea proposal, and may provide 50 coins to a team member I who has performed working meeting. In another embodiment, when at least one of tasks configuring a project is completed, team members may subsequently designate a coin quantity to be provided with respect to the completed task.

In one embodiment, the coin may include a coin for an article purchase. The coin for an article purchase is a coin by which an article necessary to perform a project can be purchased. A coin for evaluation and compensation and a coin for an article purchase may be exchanged.

At step S2500, the server 100 may transmit the provision details of the coin to the node on the blockchain. For example, the provision details of the 20 coins provided from the server 100 to the team member K may be transmitted to the node on the blockchain. Accordingly, the provision details of the coin cannot be forged or falsified by a third party, and the provision details of the coins are shared by all team members based on blockchain data. Accordingly, the project activity contents of each of the team members can be transparently managed.

At step S2600, when the project is terminated, the server 100 may evaluate a level of a contribution to the project by each of the team members based on a total coin quantity provided to each of the team members. The server 100 may obtain, from the blockchain, information on a total coin quantity provided to each of the team members. As described at step S2400, a team member who has a higher level of a contribution to a project and who has been actively involved in the project may be provided with more coins for compensation and evaluation. For example, the server 100 may determine that a level of a contribution of a team member I provided with 50 coins is higher than a level of a contribution of a team member K provided with 20 coins.

Accordingly, a team member provided with more coins may be determined to have a higher level of a contribution to a project.

Figure 4:
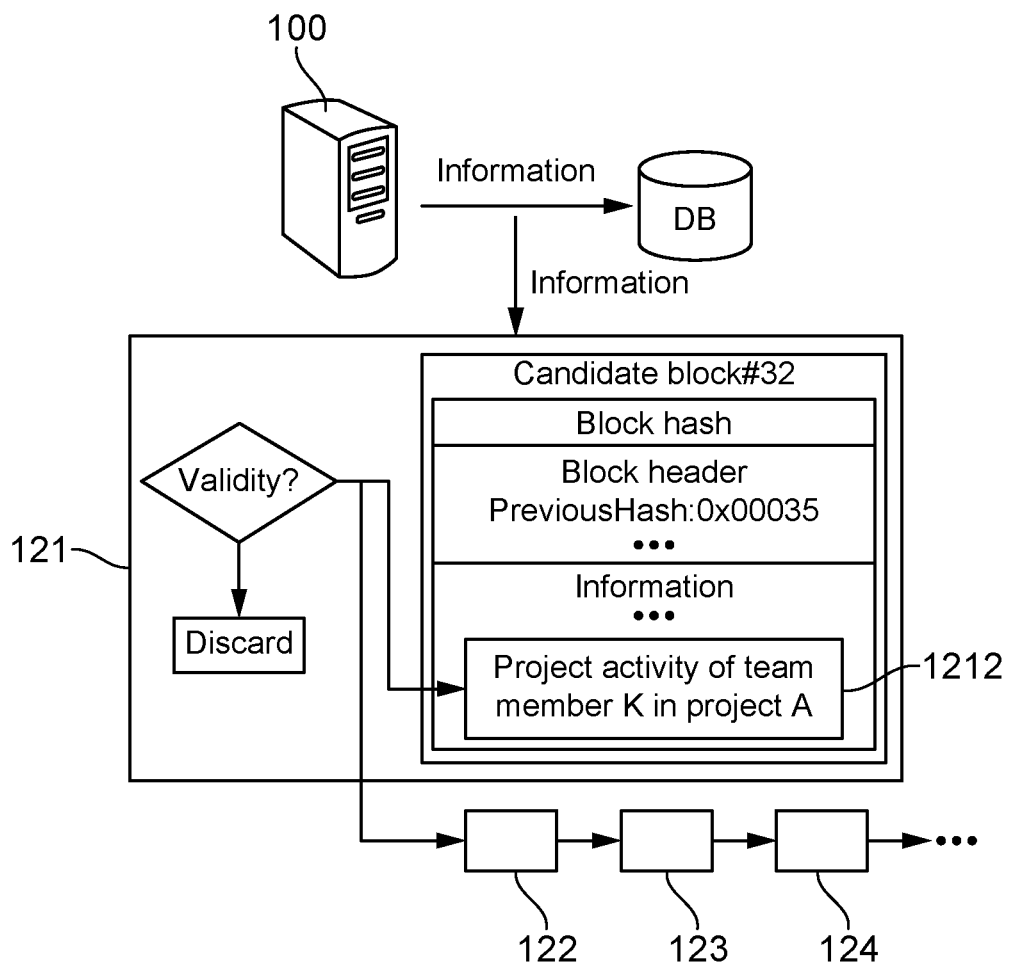
FIG. 4 illustrates a concept in which project activity information is protected based on a blockchain according to an embodiment.

FIG. 4 illustrates a concept in which project activity information is protected based on a blockchain according to an embodiment.

Referring to FIG. 4, the server 100 may update the DB with information and simultaneously store project activity information in a node on the blockchain. The project activity information may include all activities generated between project team members. For example, the project activity information may include a role responsible for each execution step such as a team leader, examination, a purchase, or fabrication, an execution completion report on at least one of tasks configuring a project, the execution results of the project, evaluation of the results or a contribution ratio of each of the team members.

Hereinafter, information stored in a node on the blockchain may be activity information or evaluation for a project "A." For example, the information may include the contents of a task performed by a team member K among tasks configuring the project "A."

The server 100 may encrypt information and transmit the encrypted information to the node 121 on the blockchain 120.

The node 121 may decrypt the encrypted information, and may verify whether the information is valid based on a result of the decryption. If the information is not valid as a result of the verification of the validity of the information, the node 121 may discard the information. The verification of the validity of the information according to an embodiment may be performed by comparing a first hash value, obtained by applying a hash function to the received information, with a second hash value obtained by decrypting a received cryptogram using the public key of an operator of the server 100, but the present disclosure is not limited thereto.

If the information is valid as a result of the verification of the validity of the information, the node 121 may transmit the information to the node 122 on the blockchain 120. Furthermore, the node 121 may write (1212) the information in a candidate block. When given information is written in the candidate block, the node 121 may generate a valid block by performing a proof of work (PoW) on the candidate block. Furthermore, if the validity of the information is verified by the node 122, the node 122 may add the information to the candidate block, and may generate a valid block by performing the PoW on the candidate block.

Each of the node 123 and the node 124 may perform the same operation as the node 122.

A process of generating, by the node 121, a valid block and adding information to the blockchain is described. The node 121 may calculate the root of a Merkle tree for pieces of given information. The node 121 may generate a hash reference indicative of a previous block header from the viewpoint of a block to be added to the blockchain. The node 121 may obtain a degree of difficulty necessary for the PoW or restriction condition of the block to be added to the blockchain. The node 121 may confirm whether a value of a block hash generated by applying a hash function to the root of the Merkle tree, the hash reference indicative of the previous block header, the degree of difficulty, the data of a timestamp, and a nonce satisfies the restriction condition. The node 121 may obtain a value of the nonce that satisfies the restriction condition while increasing the nonce from 0 to 1, and may perform the PoW on a candidate block. The node 121 may add the candidate block to the blockchain as a valid block. Furthermore, the node 121 may transmit the valid block to other nodes (e.g., 122, 123, and 124) on the blockchain.

Each of the nodes 122, 123, and 124 on the blockchain may add the valid block to a blockchain owned by each of the nodes 122, 123, 124, and 125 by performing verification on the valid block received from the node 121.

In FIG. 4, the process of writing project activity information in a blockchain has been described, but the provision details of a coin or the transaction history of a coin may also be written in a blockchain using the same method.

Pieces of activity information for a project can be safely protected based on the blockchain technology. Furthermore, in order to achieve an object of a project, a process performed by team members is written based on the blockchain technology. The forgery of project activity information is impossible, the transparency of the project activity information can be improved, and a level of a contribution of each of team members can be evaluated more objectively.

The descriptions are intended to provide illustrative elements and operations for implementing the present disclosure. The technological spirit of the present disclosure will include not only the aforementioned embodiments, but implementations which may be obtained by simply changing or modifying the above embodiments. Furthermore, the technological spirit of the present disclosure will include implementation which may be achieved by easily changing or modifying the aforementioned embodiments in the future.

What is claimed is:

1. A method of evaluating a project, the method performed by a server comprising:
   determining user terminals of team members who are to perform a project based on project related information;
   receiving project activity contents comprising an execution completion report and an execution result of the project generated by at least one of the user terminals;
   determining performance results of the team members by each of the team members based on the execution completion report and execution result of the project comprising the project activity contents at a server;
   transmitting the performance results for the project activity contents and the performance results of the team members to a node;
   encrypting the performance results for the project activity contents and the performance results of the team members at the node;
   decrypting, at the node, the encrypted performance results of the team members for the project, verifying whether the information is valid by comparing a first hash value obtained by applying a hash function to the received information, with a second hash value obtained by decrypting a received cryptogram using a public key of an operator of the server;
   if the information is valid as a result of the verification of the validity of the information, transmitting and encrypting the performance results for the project activity contents and the performance results of the team members to the node or an different node on a blockchain;
   providing a coin to at least one of the user terminals of the team members as a compensation for the performance results and the project activity contents;
   transmitting the provision details of the coin to the node on the blockchain; and
   evaluating, by the server, a level of a contribution to the project by each of the team members based on the provision details of the coin written in the blockchain when the project is terminated, wherein providing the coin comprises:
   providing a first coin quantity corresponding to a first activity configuring the project, to a first user terminal of the first team member who has performed the first activity; and
   providing a second coin quantity corresponding to a second activity configuring the project, to a second user terminal of the second team member who has performed the second activity; and wherein evaluating, by the server, the level of a contribution to the project is performed based on a comparison between a total coin quantity, provided to the first user terminal of the first team member, with a total coin quantity provided to the second user terminal of the second team member.

2. A method of evaluating a project, the method performed by a server comprising:
   determining user terminals of team members who are to perform a project based on project related information;
   receiving project activity contents comprising an execution completion report and an execution result of the project generated by at least one of the user terminals;
   determining performance results of the team members based on the execution completion report and an execution result of the project included the project activity contents at a server;
   transmitting the performance results for the project activity contents and the performance results of the team members to a node;
   encrypting the performance results for the project activity contents and the performance results of the team members at the node;
   decrypting, at the node, the encrypted performance results of the team members for the project, verifying whether the information is valid by comparing a first hash value obtained by applying a hash function to the received information, with a second hash value obtained by decrypting a received cryptogram using a public key of an operator of the server;
   if the information is valid as a result of the verification of the validity of the information, transmitting and encrypting the performance results for the project activity contents and the performance results of the team members to the node or a different node on a blockchain;
   transmitting the performance results for the project activity contents and the performance results of the team members to the node on a blockchain;
   providing a coin to at least one of the user terminals of the team members as a compensation for the performance results and the project activity contents;
   transmitting the provision details of the coin to the node on the blockchain; and
   evaluating, by the server, a level of a contribution to the project by each of the team members based on the provision details of the coin written in the blockchain when the project is terminated,
   wherein provides the coin comprises:
   providing a first coin quantity, corresponding to a first activity configuring the project, to a first user terminal of a first team member who has performed the first activity; and
   providing a second coin quantity, corresponding to a second activity configuring the project, to a second user terminal of a second team member who has performed the second activity, wherein the first coin quantity and the second coin quantity are previously designated and stored in a database, and wherein evaluating, the server, the level of a contribution to the project is performed based on a comparison between a total coin quantity, provided to the first user terminal of the first team member, with a total coin quantity provided to the second user terminal of the second team member.

* * * * *